United States Patent [19]

Ikeno et al.

[11] Patent Number: 4,624,542
[45] Date of Patent: Nov. 25, 1986

[54] BUFFER FOR VIEWFINDER MIRROR IN A SINGLE LENS REFLEX CAMERA

[75] Inventors: Tomohisa Ikeno, Tokyo; Akira Katayama, Koganei; Hidefumi Obo, Tokyo, all of Japan

[73] Assignee: Nippon Kogaku K. K., Tokyo, Japan

[21] Appl. No.: 696,036

[22] Filed: Jan. 29, 1985

[30] Foreign Application Priority Data

Feb. 3, 1984 [JP] Japan .................................. 59-18891

[51] Int. Cl.⁴ ............................................. G03B 19/12
[52] U.S. Cl. .................................................. 354/152
[58] Field of Search ................ 354/152, 153, 155, 156

[56] References Cited

U.S. PATENT DOCUMENTS

| | | | |
|---|---|---|---|
| 3,738,246 | 6/1973 | Sato | 354/152 |
| 3,774,517 | 11/1973 | Jesus | 354/152 |
| 3,852,791 | 12/1974 | Eukuda | 354/152 |
| 4,003,066 | 1/1977 | Shono | 354/152 |
| 4,327,982 | 5/1982 | Yamamichi et al. | 354/156 |
| 4,469,420 | 9/1984 | Uematsu | 354/153 |
| 4,480,904 | 11/1984 | Hiramatsu | 354/152 |

Primary Examiner—A. A. Mathews
Attorney, Agent, or Firm—Shapiro and Shapiro

[57] ABSTRACT

A buffer comprises a specially designed bearing for supporting the rotation axis of a rotatable mirror. The bearing structure is so designed that when the rotation of the mirror is stopped by a stopper, the bearing can shift the rotation axis in the direction in which force is applied to the rotation axis. This shift takes place at the moment of mirror stop. Immediately after the shift, the rotation axis is returned to its original position by a biasing force.

15 Claims, 5 Drawing Figures

4,624,542

BUFFER FOR VIEWFINDER MIRROR IN A SINGLE LENS REFLEX CAMERA

BACKGROUND OF THE INVENTION

1. Field of the Invention

The present invention relates to a support structure for a viewfinder mirror movably mounted in a single lens reflex camera. More particularly, the present invention relates to such a buffer for a mirror.

2. Description of the Prior Art

Conventionally, the viewfinder mirror in a single lens reflex camera is rotatably mounted so that it can move between two positions i.e. working position and retracted position. When the operator is viewing the object through a finder eyepiece, the viewfinder mirror is held in the optical path of the object light from a photographing lens to reflect the object light beam toward the finder optical system. This position is the working position of the viewfinder mirror. Immediately before the start of exposure on the film, the mirror is brought to a position out of the optical path of the object light. This position is the retracted position.

The shift of the mirror from the working position to the retracted position is generally achieved by rotating the mirror about a rotation axis along one edge of the mirror by about 45 degrees. When the mirror reaches the position in which the mirror surface is substantially parallel to the optical axis of the photographing lens, the rotation of the mirror is stopped. At the stop, the mirror is apt to rebound due to shock. If a portion of the rebounding mirror enters the optical path of the object light, the object image on the film may be impaired.

After the completion of film exposure, the mirror is again turned down to the working position in the optical path of the object light. When stopped at the working position, the mirror is again subjected to shock which may cause the stopped mirror to unbound in an oscillatory manner. Such rebounding of the mirror at the stop in the working position may hinder the operator from viewing the object through the viewfinder because the object image formed on the finder screen oscillates at that time. The problem is exacerlated in particular when a continuous shooting is performed using a motor drive unit. In this picture-taking mode, the mirror-up and mirror-down movements are repeated many times at very short intervals and, therefore, the time during which the object image is stable is very short. Because of this, the viewing of the object image as well as focusing are rendered very difficult.

In order to solve the problem, there have been proposed many buffers for the rotatable viewfinder mirror of the type mentioned above. However, almost all of the prior buffers for viewfinder mirrors are not satisfactory. Some of them need a complicated additional mechanism and some of them cannot produce an adequate effect to damp mirror shock.

SUMMARY OF THE INVENTION

Accordingly, the principal object of the invention is to provide novel buffer for a movable viewfinder mirror which is simple in structure and has a sufficiently high buffering effect.

To attain this object the buffer according to the invention comprises a specially designed bearing for supporting the rotation axis of the turnable mirror. The bearing structure is so designed that when the rotation of the mirror is stopped by a stopper, the bearing can shift the rotation axis in the direction in which force is applied to the rotation axis. This shift takes place at the moment of mirror stop. Immediately after the shift, the rotation axis is returned to its original position by a biasing force.

DESCRIPTION OF PREFERRED EMBODIMENTS

Figure 1:
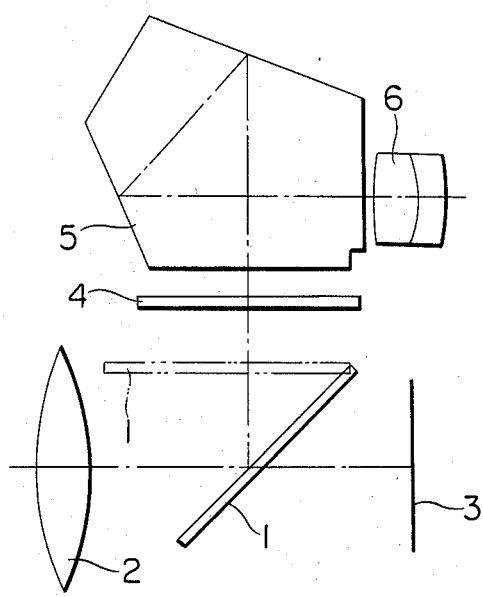
FIG. 1 is a schematic view showing the arrangement of a viewfinder mirror in a conventional single lens reflex camera.

FIG. 1 schematically shows the arrangement of a viewfinder mirror movably mounted in a known single lens reflex camera. The mirror 1 is rotatable between the working position indicated by the solid line and the retracted position suggested by the phantom line. In the working position for viewing, the mirror 1 is disposed 45 degrees inclined relative to the optical axis between a photographing lens 2 and photosensitive film 3. The object light beam transmitted through the photographing lens 2 is reflected upwardly by the mirror 1 to form an object image on a finder screen 4. The operator can view the object image through a penta-roof prism 5 and an eyepiece 6. In an interlocked relation with an exposure starting operation, the mirror 1 is turned up to the retracted position outside of the optical path of the object light beam.

The structure of the rotatable mirror 1 in accordance with the invention will be described with reference to FIGS. 2 and 4.

The mirror 1 comprises a reflecting mirror 11 and a support plate 12. One end the mirror-supporting plate 12 is mounted on a shaft 20 for rotation about the shaft. One end 21 of the shaft 20 is received in a hole formed on a wall 7 forming a mirror box within the camera. The other end 22 of the shaft 20 is received in a hole 81 formed on a fixed base plate 8 within the camera. The shaft is rotatable in the bearing holes.

Figure 3:
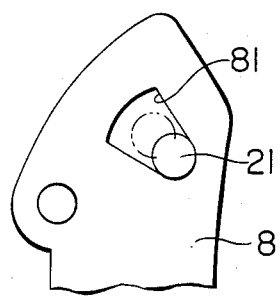
FIG. 3 is an enlarged view of the principal part thereof.

FIG. 3 shows the form of the hole 81. As seen in the figure, the inner diameter of the hole 81 is larger than the diameter of the shaft 20. Therefore, the shaft end 22 is allowed to move in the plane containing the base plate 8. The hole 81, therefore, constitutes a half bearing for the shaft 20.

Figure 4:
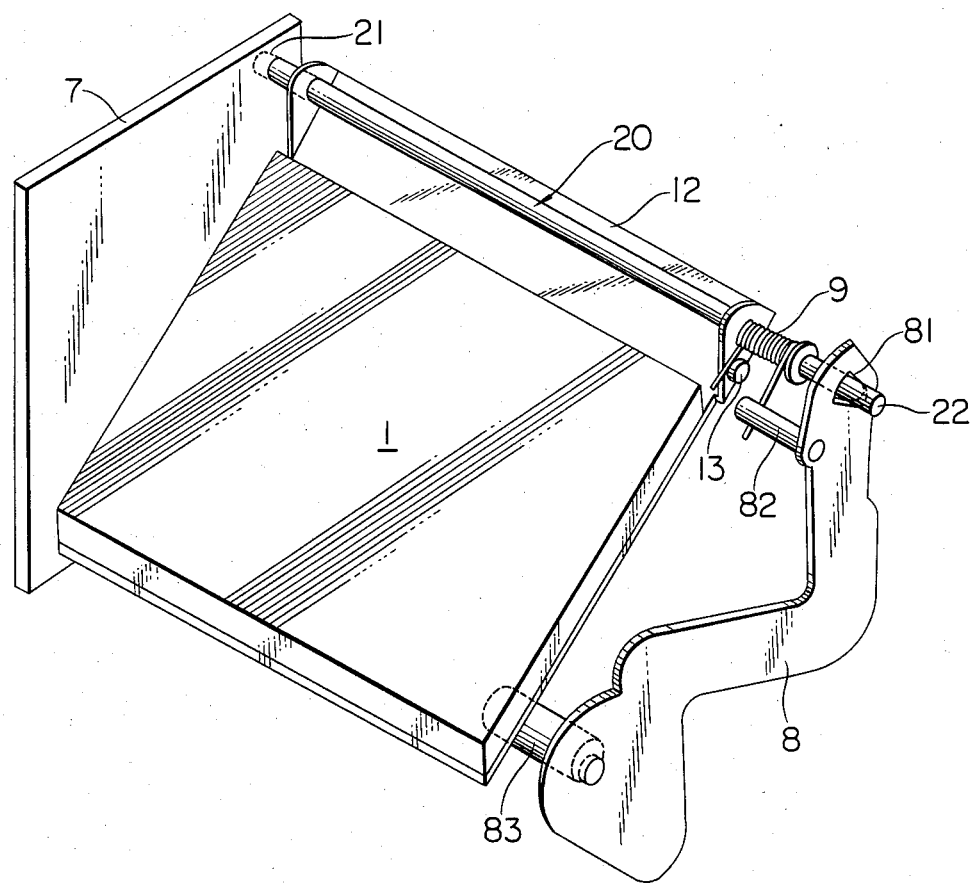
FIG. 4 is a perspective view of the embodiment shown in FIG. 2.

As clearly seen in FIG. 4, a torsion spring 9 is disposed on the shaft 20 at a part near the shaft end 22. One of the arms of the torsion spring 9 bears on a pin 82 fixed on the base plate 8 and the other arm of the spring 9 bears on a pin 13 fixed on the mirror-supporting plate 12. In this disposition, the torsion spring 9 has a biasing force tending to rotate the support plate 12 counterclockwise about the shaft 20. When the mirror 1 is in its working position for viewing, the two arms of the spring 9 are substantially parallel to the mirror-supporting plate 12. Therefore, in this position, the shaft 20 is biased toward the lower portion at the right side of the inner circumferential surface of the hole 81 and the shaft end 22 is held in contact with the inner surface of the hole at that portion. At its free edge side, the mirror-supporting plate 12 lies on an adjustable eccentric pin 83 extending from the base plate 8. The function of the pin 83 is to keep the mirror 1 correctly in the working position for viewing against the biasing force tending to rotate the mirror 1 counterclockwise. To perform the function precisely, the pin 83 is adjustable by turning.

Figure 2:
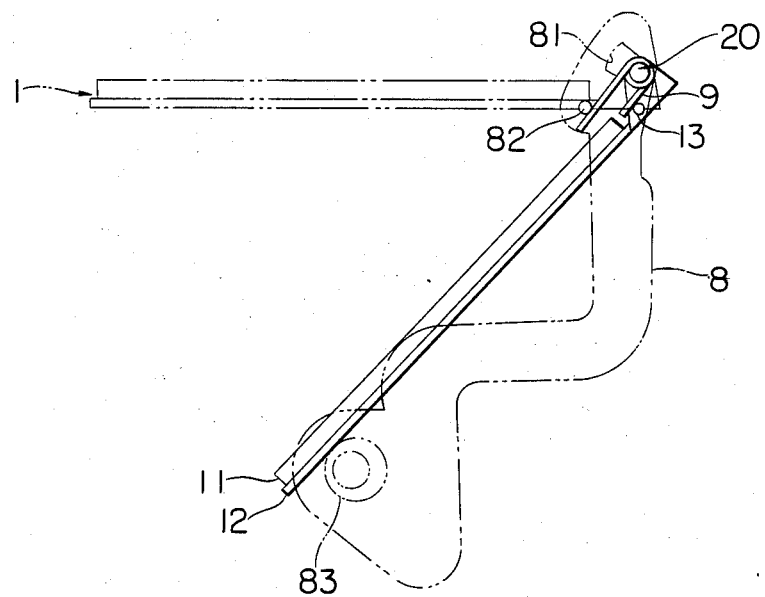
FIG. 2 is a side view of a turnable mirror with a buffer showing an embodiment of the invention.

In conjunction with an operation for film exposure, a mirror-driving mechanism (not shown) is driven to turn the mirror 1 up to the phantom position in FIG. 2 and the mirror is held in the retracted position. In time with the completion of the film exposure, the mirror is allowed to rotate counter-clockwise under the action of the bias spring 9.

In the course of turn-down, the mirror runs against the stopper pin 83. At this moment of collision, a portion of the torque about the shaft for the counter-clockwise rotation of the mirror 1 changes over to a torque for the counter-clockwise rotation of the mirror about the contact point between the mirror 1 and the stopper pin 83. As a result, the shaft end 22 moves up away from the right-hand lower portion of the inner circumferential surface of the hole 81 as shown by the phantom line in FIG. 3. In other words, at the moment of collision the shaft 20 swings, with the shaft end 21 received in the wall 7 serving as the supporting point of the swing movement.

It is desirable that the hole 81 be so large as not to hinder the floating of the shaft end 22 in the hole.

Simultaneously with the lifting of the shaft end 22 in the hole 81, the mirror-supporting plate 12 springs back by restitution after the collision and lifts up floating apart from the pin 83. Preferably the distance between the shaft 20 and the pin 83 is determined considering the restitution coefficient of the pin 83, the inertial moment of the mirror 1, the biasing force of the spring 9 etc. in such manner that the amount of lift of the mirror-supporting plate 12 from the pin 83 becomes approximately equal to the amount of lift of the shaft end 22 in the bearing hole 81 at that time.

The spring 9 acts on the mirror 1 and shaft 20 in the direction against their floating. Consequently, it accelerates early attenuation of the rebounding of the mirror 1.

In this manner, according to the illustrated embodiment, the rotational or turning energy of the mirror 1 is dispersed toward two opposite ends of the mirror, which has an effect to decrease the amplitude of the rebounding even if energy loss is neglected. In fact, however, there is caused an increased amount of energy loss by the dispersion of the turning energy. Since the energy loss is increased and the amplitude of the rebounding is decreased, a sufficiently large effect for restraining the rebounding of the mirror can be obtained in total.

Many modifications are possible in the above-shown embodiment. For example, the spring 9 may be replaced by two separate springs, one for storing the turning force of the mirror 1 and the other for biasing the shaft 20 in the hole 81.

Also, as a modification, the hole 81 may be formed in the mirror-supporting plate 12 while providing the shaft 20 on the base plate 8. This arrangement of hole 81 and shaft 20 is opposite to that shown in the above embodiment, but it will be apparent that the manner of operation of the modification is entirely the same as that of the above embodiment and that the same effect can be attained.

Figure 5:
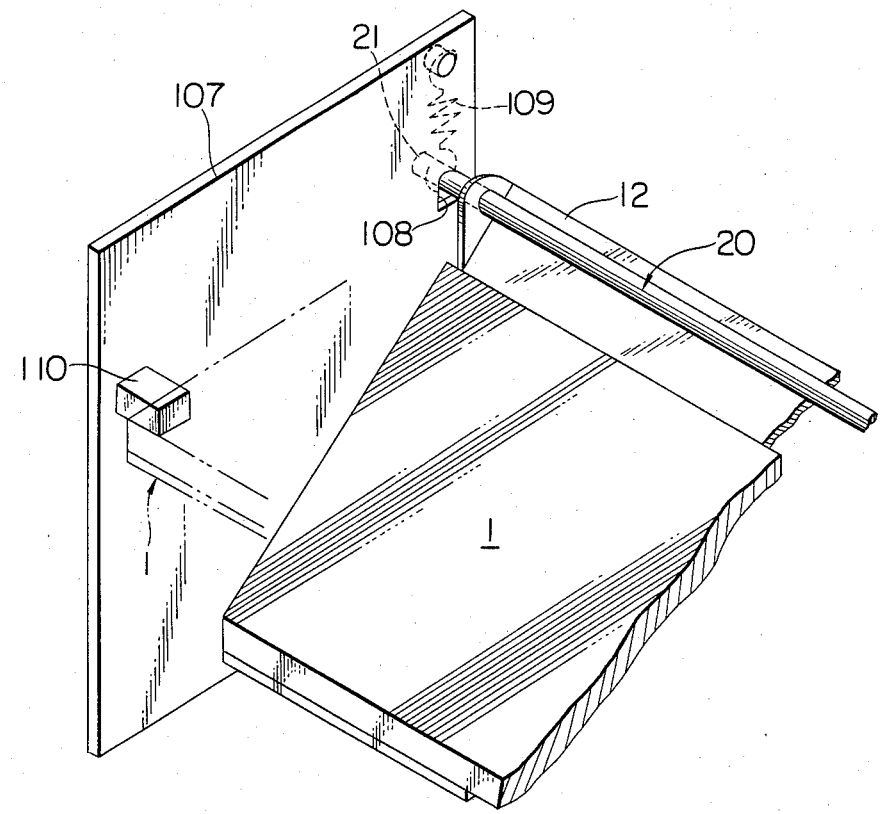
FIG. 5 is a perspective view of another embodiment.

FIG. 5 shows another embodiment of the invention.

This second embodiment is additionally provided with means for restraining the rebounding of the mirror produced at turn-up. In a fixed wall member 107 there is formed also a hole 108 in a form similar to that of the above-mentioned hole 81. One end 21 of the shaft 20 is received in the hole 108, passing through it, and is biased by a spring 109 which tends to move the shaft end 21 upwardly. A stopper 110 is provided on the stationary wall 107 to position the mirror 1 at the retracted position. When the mirror 1 runs against the stopper 110 in the course of turn-up movement, the mirror 1 rebounds.

However, according to the same principle as previously described, the rebounding of the mirror is damped to a great extent.

What is claimed is:

1. In a camera having a viewfinder mirror rotatable between first and second positions on a swing axis parallel to a reflection surface of the mirror in order to switch over the optical path of a light beam coming through a photographing lens of the camera, apparatus for supporting said mirror comprising:
   a base plate member fixedly mounted on said camera;
   stop means fixedly mounted on said camera and disposed to contact one end of said mirror for stopping said mirror at said second position when said mirror reaches said second position from said first position;
   connection means cooperable between another end of said mirror and said base plate member for connecting said mirror with said base plate member, said connection means including a shaft member disposed along said swing axis and half bearing means for supporting said shaft member for rotation on said swing axis and for permitting said shaft member to shift from said swing axis by a predetermined amount in a direction in which a force acts on said another end of said mirror when said mirror is stopped by said stop means, said direction being substantially perpendicular to said reflection surface of said mirror; and
   biasing means acting on said connecting means for maintaining said shaft member on said swing axis during rotation of said mirror from said first position to said second position.

2. Apparatus according to claim 1, wherein said half bearing means includes a bearing member having a hole through which said shaft member passes, said hole having predetermined length in said direction substantially perpendicular to said reflection surface of said mirror occupying said second position, said shaft member being movable through entirety of the predetermined length of the hole.

3. Apparatus according to claim 2, wherein said viewfinder mirror is provided with a frame member supporting said reflection surface, wherein said shaft member is connected to the frame member, and wherein said bearing member is integrally mounted to said base plate member.

4. Apparatus according to claim 3, wherein said biasing means is disposed to exert a biasing force between said frame member and said base plate member.

5. Apparatus according to claim 4, wherein said biasing means includes a coiled spring coiled around said shaft member and having one end engaged with said frame member and another end engaged with said base plate member.

6. Apparatus according to claim 2, wherein said viewfinder mirror occupies said first position for film exposure and occupies said second position for subject observation and wherein said reflection surface of said mirror is inclined relative to the optical axis of said photographing lens when said mirror is at said second position.

7. Apparatus according to claim 2, wherein said viewfinder mirror occupies said first position for subject observation and occupies said second position for film exposure and wherein the reflection surface of said mirror is substantially parallel to the optical axis of said photographing lens when said mirror is at said second position.

8. In a camera having a viewfinder mirror for movement between a first position and a second position in order to switch the optical path of light received through a photographig lens of said camera, support apparatus for said mirror comprising:
   a base member fixed within said camera,
   shaft means for supporting said mirror for rotation between said first and second positions on a swing axis at one end of said mirror,
   half bearing means fixedly disposed on one of said base member and said one end of said mirror and cooperable with a portion of said shaft means for locating said one end of said mirror in position for rotation on said swing axis,
   stop means fixedly mounted within said camera and disposed to contact said mirror toward an opposite end thereof for stopping said mirror when it reaches said second position upon rotation from said first position, and
   biasing means for maintaining the position of said one end of said mirror relative to said swing axis during rotation of said mirror,
   said half bearing means being constructed in such a manner as to permit relative shifting between said half bearing means and said portion of the shaft means in response to and along the direction of a force acting on said one end of said mirror when said mirror contacts said stop means,
   whereby said one end of said mirror is permitted to shift relative to said swing axis in the direction of said force, against the action of said biasing means, said biasing means acting to restore the position of said one end of said mirror relative to said swing axis.

9. Apparatus according to claim 8, wherein said half bearing means includes means defining a hole in said one of said base member and said one end of said mirror, said hole receiving said portion of said shaft means and having a diameter greater than that of said portion of said shaft means.

10. Apparatus according to claim 9, wherein said viewfinder mirror includes a reflection surface and a frame supporting said reflection surface and wherein one end of said frame is supported on said shaft means.

11. Apparatus according to claim 10, wherein said hole is disposed in said base member and wherein another portion of said shaft means is connected to said one end of said frame.

12. Apparatus according to claim 10, wherein said hole is disposed in said one end of said frame and wherein another portion of said shaft means is connected to said base member.

13. Apparatus according to claim 10, wherein said biasing means is disposed to exert a biasing force between said frame and said base member.

14. Apparatus according to claim 13, wherein said biasing means includes a torsion spring coiled about said shaft means and having one end engaged with said frame and another end engaged with said base member.

15. Apparatus according to claim 8, further comprising:
   additional stop means for contacting said mirror toward said opposite end to stop said mirror when it reaches said first position upon rotation from said second position,
   an additional base member fixed within said camera at an opposite side of said mirror from the first-mentioned base member,
   additional half bearing means fixedly disposed on one of said additional base member and said one end of said mirror and cooperable with another portion of said shaft means for locating said one end of said mirror in position for rotation on said swing axis,
   additional biasing means cooperable between said one end of said mirror and said additional base member for maintaining the position of said one end of said mirror relative to said swing axis during rotation of said mirror,
   said additional half bearing means being constructed in such a manner as to permit relative shifting between said additional half bearing means and said another portion of said shaft means in response to and along the direction of a force acting on said one end of said mirror when said mirror contacts said additional stop means,
   whereby said one end of said mirror is permitted to shift relative to said swing axis in the direction of the last-mentioned force, against the action of said additional biasing means, said additional biasing means acting to restore the position of said one end of said mirror relative to said swing axis.

* * * * *